(12) United States Patent
Nakajima et al.

(10) Patent No.: US 7,116,837 B2
(45) Date of Patent: Oct. 3, 2006

(54) METHOD AND APPARATUS FOR REDUCING IMAGE NOISE

(75) Inventors: Ken Nakajima, Tokyo (JP); Satoshi Mitsui, Aichi (JP)

(73) Assignee: Sony Corporation, Tokyo (JP)

( * ) Notice: Subject to any disclaimer, the term of this patent is extended or adjusted under 35 U.S.C. 154(b) by 662 days.

(21) Appl. No.: 10/258,466

(22) PCT Filed: Feb. 20, 2002

(86) PCT No.: PCT/JP02/01477

§ 371 (c)(1), (2), (4) Date: Apr. 14, 2003

(87) PCT Pub. No.: WO02/069264

PCT Pub. Date: Sep. 6, 2002

(65) Prior Publication Data

US 2003/0152287 A1    Aug. 14, 2003

(30) Foreign Application Priority Data

Feb. 26, 2001    (JP) ............................ 2001-050908

(51) Int. Cl.
  *G06K 9/40* (2006.01)
  *H04L 27/22* (2006.01)
(52) U.S. Cl. .................................... 382/260
(58) Field of Classification Search ............. 382/254, 382/260–275; 358/3.26
  See application file for complete search history.

(56) References Cited

U.S. PATENT DOCUMENTS 4,463,375 A * 7/1984 Macovski ................ 378/98.12
5,036,405 A   7/1991 Kojima
5,715,335 A * 2/1998 De Haan et al. ............. 382/265
5,771,318 A * 6/1998 Fang et al. ................... 382/261
5,778,107 A * 7/1998 Kataoka ....................... 382/291
6,347,161 B1 * 2/2002 Mancuso ..................... 382/261
6,980,696 B1 * 12/2005 Maurer ........................ 382/262
7,016,549 B1 * 3/2006 Utagawa ...................... 382/261

FOREIGN PATENT DOCUMENTS

| EP | 1 061 734 A2 | 12/2000 |
| JP | 63-129470 | 6/1988 |
| JP | 1-128170 | 5/1989 |
| JP | 6-86104 | 3/1994 |
| JP | 9-83804 | 3/1997 |
| JP | 11-17954 | 1/1999 |
| JP | 2001-5958 | 1/2001 |

\* cited by examiner

*Primary Examiner*—Kanjibhai Patel
(74) *Attorney, Agent, or Firm*—Frommer Lawrence & Haug LLP; William S. Frommer; Thomas F. Presson (57) ABSTRACT

An image reduction method and apparatus to digitize and process an image signal. Level values a to h of peripheral pixels of a pattern, the level value of a watched pixel, and the value of a reference level $\Theta$ are input. The level value o of the watched pixel is a gain set value $\alpha$, and added with the level values a to h output from the output ports of a selection circuit and supplied to a divider. The gain set value a is added with a value output from the selection circuit and supplied to the divider. The degree of signal processing is set by a $\epsilon$-filter and the rate of watched pixels relating to the averaging operation is controlled and thereby, optionally setting the degree of signal processing.

8 Claims, 5 Drawing Sheets

RELATED ART

FIG. 6

METHOD AND APPARATUS FOR REDUCING IMAGE NOISE

TECHNICAL FIELD

The present invention relates to an image noise reduction method and apparatus for being preferably used to process, for example, an image signal by digitizing it. Particularly, the present invention relates to an image noise reduction method and apparatus for solving a trouble when reducing noise components of an image signal by using the so-called ε-filter.

BACKGROUND ART

For example, to reduce noise components included in an image signal, various methods have been proposed so far. Particularly, one of the simplest methods having a large noise reduction effect is a method using a low-pass filter (hereafter referred to as LPF). The LPF is a device for transmitting only signals having components lower than a reference frequency. That is, by inputting a signal whose frequencies change to the LPF and observing the amplitude of an output signal, a characteristic is obtained that a component at a higher frequency lowers in level.

However, when viewed from a different point, the LPF uses the average value of a watched pixel and adjacent pixels around the watched pixel as a new value of the watched pixel. That is, in the case of this method, signal levels of watched pixels strongly correlated with peripheral pixels are not greatly changed in their values even if the levels are averaged. However, random noise components having no correlation are averaged with noise components included in peripheral pixels and thereby, the value of the component is approached to "0".

Therefore, when using the above LPF, the noise suppression effect increases as the search area of peripheral pixels is widened. However, in the case of the averaging operation with peripheral pixels by the LPF, image edge information is reduced similarly to noises and resultantly, the whole image becomes blurry though noises are decreased and a disadvantage occurs that the image quality is deteriorated. Therefore, an LPF serving as noise reduction means is not generally used.

To solve the disadvantage of the LPF, the so-called ε-filter is disclosed (refer to Journal of Institute of Electronics, Information, and Communication Engineers Vol. 77 No. 8, pp. 844–852, April, 1994, Kaoru Arakawa "Nonlinear Digital Filter and Its Application"). That is, in the case of the ε-filter disclosed in this document, when averaging a watched pixel and peripheral pixels, it is first determined whether the peripheral pixels has a correlation with the watched pixel.

Specifically, by setting a certain reference level θ, levels of the peripheral pixels are incorporated into averaging factors when the levels are included in the range of ±θ of the level of the watched pixel but they are not incorporated into averaging factors if they are not included in the range of ±θ. Thus, whether to incorporate all peripheral factors into averaging factors is searched and a new value of the watched pixel is obtained by the averaging operations with the watched pixel and the peripheral pixels which are regarded as operation objects.

Therefore, even if an image edge enters a search area, when the levels of pixels constituting the edge exceeds the range of ±θ of the level of the watched pixel, the edge is not regarded as an operation object, for example, it never happens that an image becomes blurry due to pixels constituting the edge being included in averaging. That is, with the ε-filter, it is possible to suppress only noise components while leaving an image edge as it is by properly selecting the value of he reference level θ.

Figure 5:
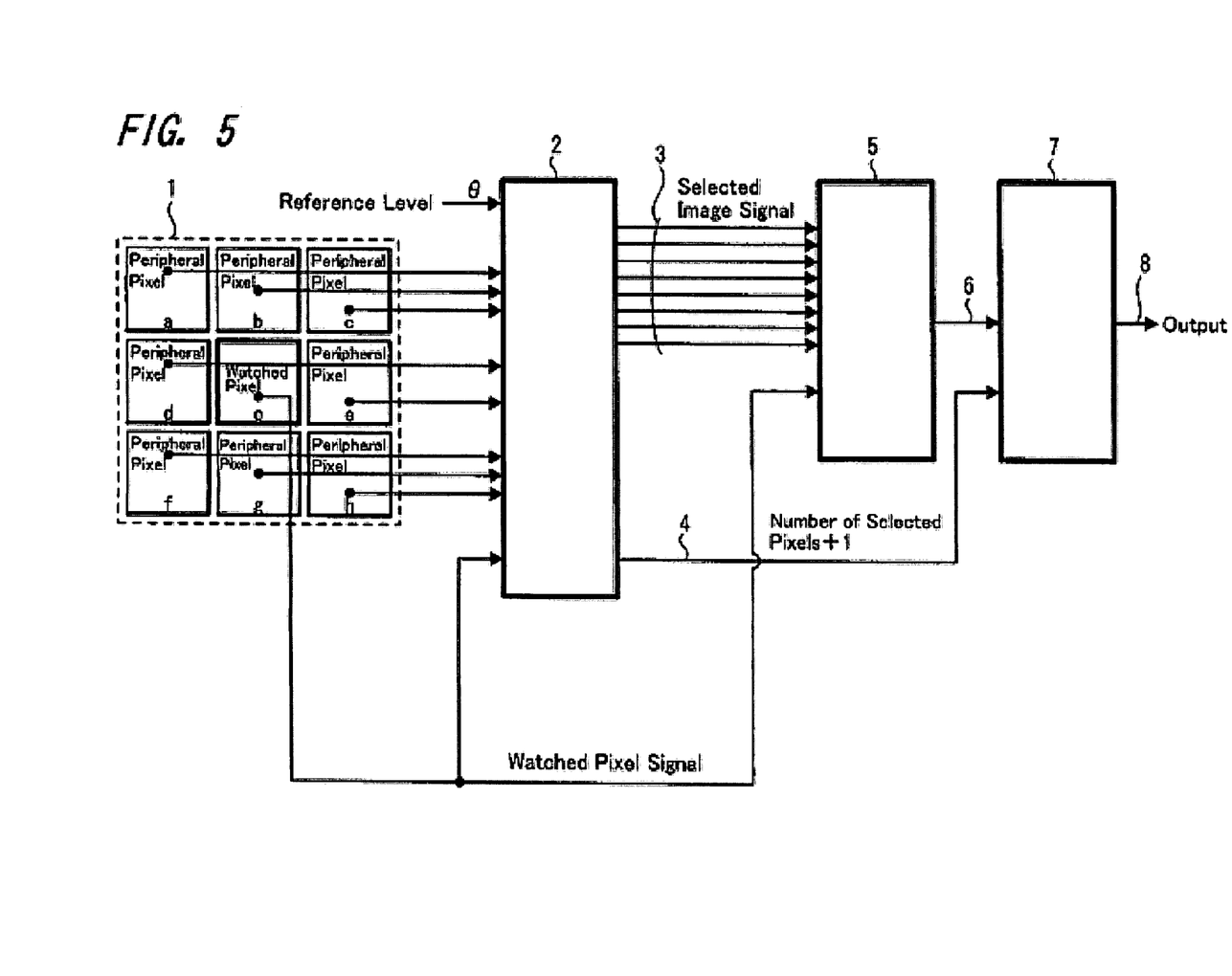
FIG. 5 is a block diagram for explaining a conventional image noise reduction apparatus.

Moreover, an actual circuit configuration of the ε-filter is described below by using FIG. 5. In FIG. 5, the diagram 1 shows a certain one point in an image area and imaged states of a watched pixel o and its peripheral pixels a, b, c, d, e, f, g, and h. Moreover, when substituting level values of these pixels with the same notation as a to h and o, the level values a to h of these peripheral pixels are supplied to a selection circuit 2. Moreover, the value of the above reference level θ and the level value o of the watched pixel are input to the selection circuit 2.

In the selection circuit 2, the absolute value (|a−o|) of the difference between the level value a of the peripheral pixel a and the level value o of the watched pixel o is first calculated and the absolute value of the difference is compared with the reference level θ. Then, when the absolute value of the above difference is smaller than the value of the reference level θ, the level value a is output to an output port 3. Moreover, when the absolute value of the difference is larger than the value of the reference level θ, the level value a is not output to the output port 3 but the value "0" is output. Furthermore, the same calculations are applied to level values b to h of other peripheral pixels b to h.

Therefore, eight output ports 3 equal to the number of peripheral pixels, for example, are provided for the selection circuit 2, and the level values a to h are output to the output ports 3 when the absolute value of the above difference is smaller than the value of the reference level θ and the value "0" is output to the ports 3 when the absolute value of the difference is larger than the value of the reference level θ. Moreover, an output port 4 is provided for the selection circuit 2 and a value obtained by adding "1" to the number of the output ports 3 to which the above level values a to h are output is output to the output port 4.

That is, level values a to h are output from the output ports 3 of the selection circuit 2 when absolute values of differences between a watched pixel and peripheral pixels are all smaller than the value of the reference level θ and the value "9" is output to the output port 4. Moreover, when absolute values of differences between the watched pixel and peripheral pixels are all larger than the value of the reference level θ, the value "0" is output from all output ports 3 and the value "1" is output from the output port 4.

Outputs of the output ports 3 of the selection circuit 2 and the level value o of the watched pixel o are supplied to an adder 5 and a value selected by the output port 6 of the adder 5 is supplied to a divider 7. Moreover, a value outputted from the output port 4 of the selection circuit 2 is supplied to the divider 7. Then, in the divider 7, a value outputted from the output port 6 of the adder 5 is divided by a value outputted from the output port 4 of the selection circuit 2 and the value of the above operation result is output by an output port 8.

A certain reference level θ is set, and levels of the peripheral pixels are incorporated into averaging factors when the levels are included in the range of ±θ of the level of a watched pixel but the levels are not incorporated into averaging factors when they are not included in the range and then, whether to incorporate all peripheral pixels into averaging factors is searched and only peripheral pixels to be incorporated as averaging factors are regarded as operation objects and as a result, a new value of a watched pixel obtained through the averaging operation with the watched pixel is output to the output port 8.

Figure 6:
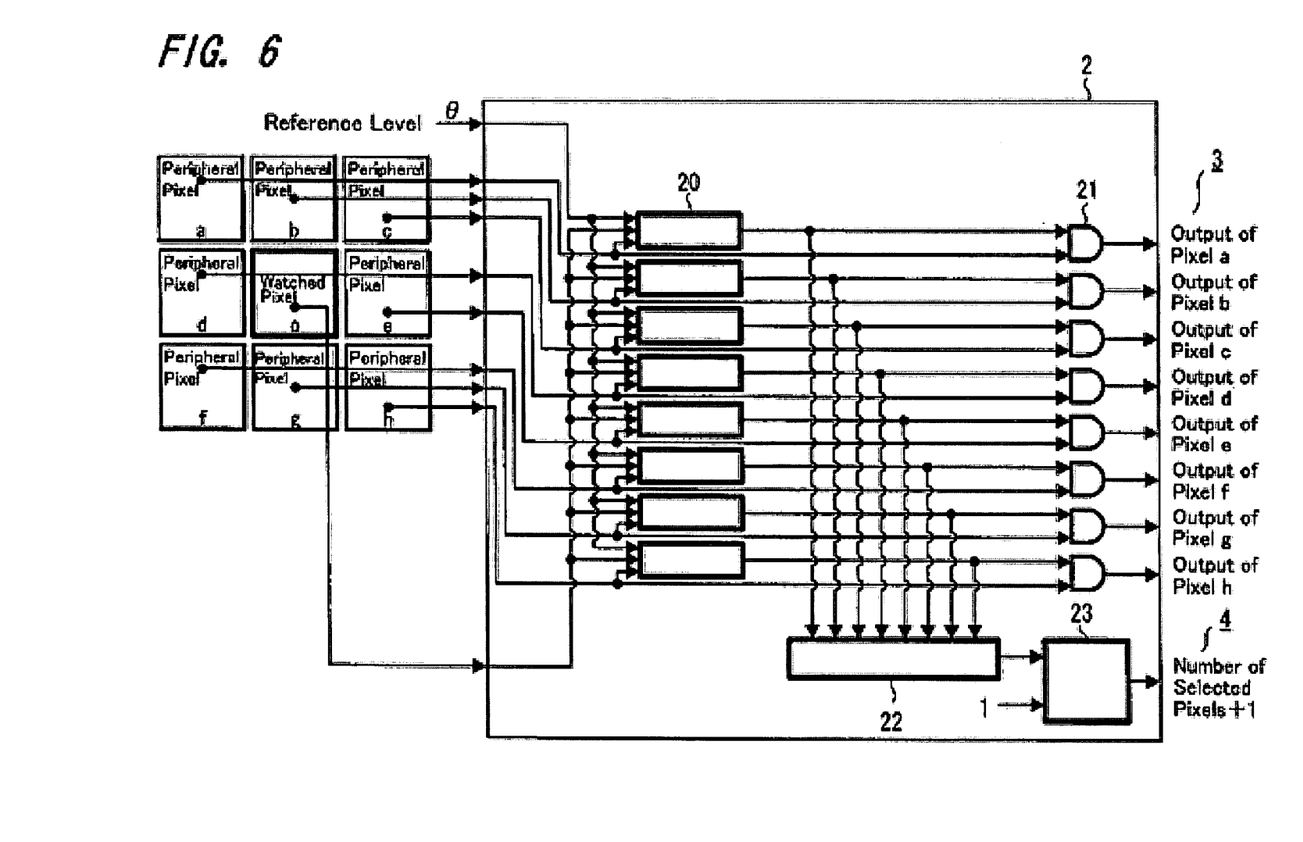
FIG. 6 is a block diagram showing a configuration of a selection circuit used for conventional image noise reduction method and apparatus.

A specific circuit configuration of the selection circuit 2 of the above device is similar to the configuration shown in FIG. 6. That is, in FIG. 6, for example, eight comparators 20 equal to the number of the above peripheral pixels are obtained. Level values a to h of the above peripheral pixels, the level value o of the watched pixel, and the value of the reference level θ are input to the comparators 20. Then, each comparator 20 outputs the value "1" when the absolute value of the difference between a peripheral pixel and the watched pixel is smaller than the value of the reference level θ.

Moreover, a signal output from each of the comparators 20 is supplied to an AND gate 21. Furthermore, level values a to h of peripheral pixels are supplied to the AND gate 21 and corresponding one of the level values a to h of peripheral pixels is output to the output ports 3 through the AND gate 21 when a signal output from each of the above comparators 20 is equal to "1". Furthermore, signals output from the comparators 20 are supplied to an adder 22. Furthermore, an addition output of the adder 22 is supplied to an adder 23 and the value "1" is added and output to the output port 4.

Thereby, in the case of this circuit configuration, level values a to h of peripheral pixels are output through the AND gate 21 when absolute values of differences between level values a to h and the level value o of the watched pixel are smaller than the value of the reference level θ. Moreover, the value "0" is output when absolute values of the differences are larger than the value of the reference level θ. Furthermore, a value obtained by adding "1" to the number of level values a to h output to the output ports 3 through the above AND gate 21 is output to the output port 4.

Thus, the selection circuit 2 outputs level values a to h when absolute values of the above differences are smaller than the value of the reference level θ and a value obtained by adding "1" to the number of output level values a to h. Moreover, the level values a to h and the level value o of the watched pixel are added and the addition value is divided by a value obtained by adding "1" to the number of output level values a to h. Thereby, the averaging operation is applied to only pixels regarded as averaging factors and a new value of the watched pixel is derived.

Thus, in the case of the above ε-filter, it is possible to effectively reduce noises while preserving an image edges. However, even when using the ε-filter, because basic processing is performed by an LPF, image details having a high-frequency component and a small amplitude disappear. Meanwhile, when an object is flat, noises easily become conspicuous and the ε-filter has a large effect. However, when there are many high-frequency components, the effect of the ε-filter is small and noises do not easily become conspicuous.

Therefore, when an object has many high-frequency components, the ε-filter is turned off. However, it is alternative whether to perform signal processing by the ε-filter or not. In this case, a case occurs that a state in which processing is performed or not performed is not necessarily the optimum image processing. That is, noises increase when no operation is performed or image details disappear when an operation is performed depending on the content of an object.

DISCLOSURE OF THE INVENTION

The present invention makes it possible to optionally set the degree of signal processing by controlling the rate of watched pixels relating to the averaging operation by the so-called ε-filter. Therefore, in the case of the present invention, the averaging operation is performed by weighting level values of watched pixels and optionally controlling the rate of the weighting. Image noise reduction method and apparatus of the present invention are disclosed correspondingly to the above mentioned.

BEST MODE FOR CARRYING OUT THE INVENTION

Figure 1:
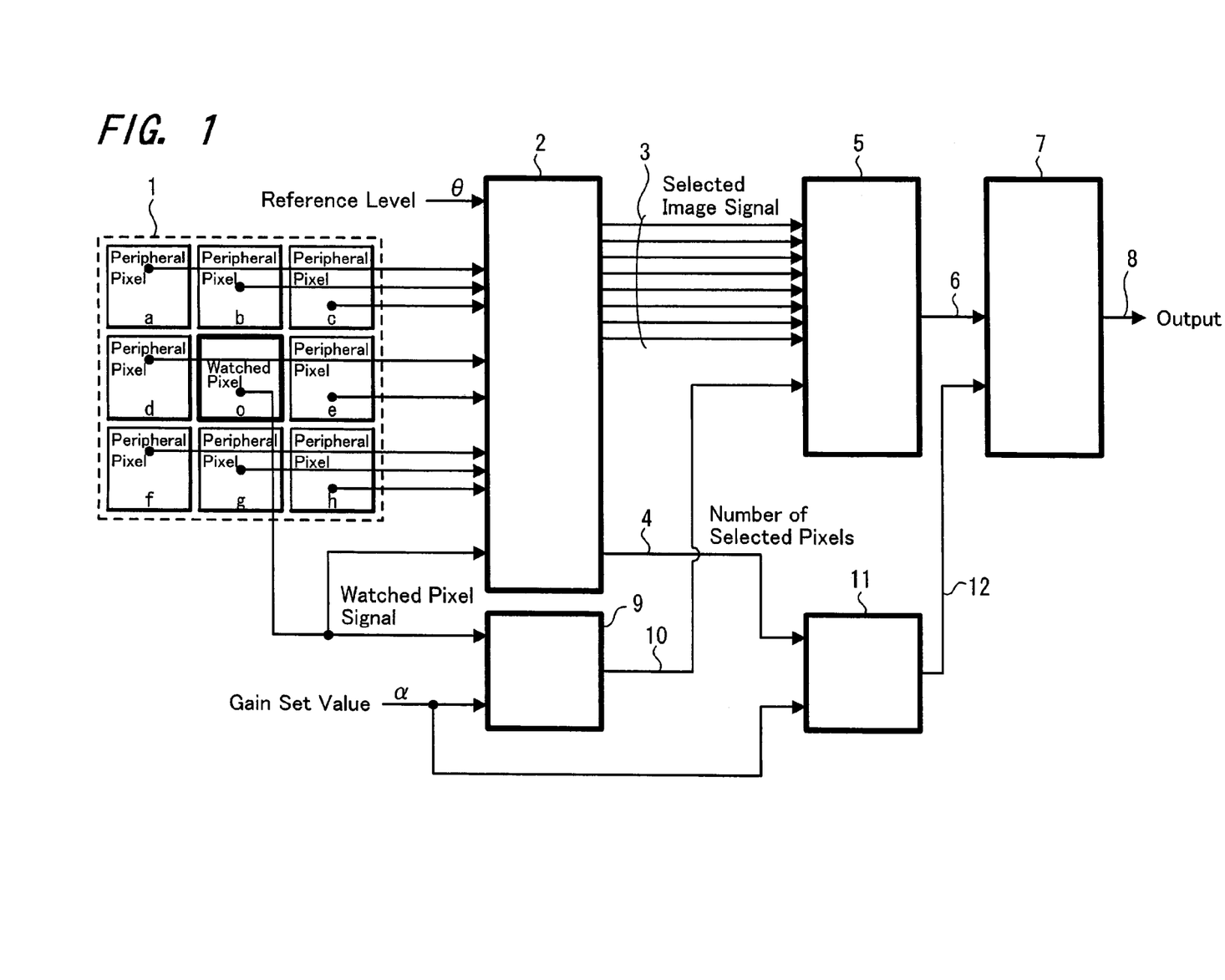
FIG. 1 is a block diagram showing a configuration of an embodiment of a selection circuit used for image noise reduction method and apparatus to which the present invention is applied.

The present invention is described below by referring to the accompanying drawings. FIG. 1 is a block diagram showing a configuration of an image noise reduction apparatus to which image noise reduction method and apparatus of the present invention are applied. In FIG. 1, a portion corresponding to that in FIG. 5 is provided with the same symbol.

In FIG. 1, a pattern 1 shows a certain point in an image area the same as FIG. 5, which images states of a watched pixel o and its peripheral pixels a, b, c, d, e, f, g, and h. Moreover, when substituting level values of these pixels with the same notations as symbols a to h and o, the level values a to h of these peripheral pixels are supplied to the selection circuit 2. Furthermore, the value of the above reference level θ and the level value o of the watched pixel are input to the selection circuit 2.

In the selection circuit 2, the absolute value (|a−o|) of the difference between the level value a of the peripheral pixel a and the level value o of the watched pixel o is first computed and the absolute value for the difference is compared with the reference level θ. Then, when the absolute value of the above difference is smaller than the value of the reference level θ, the level value a is output to the output ports 3. When the absolute value of the difference is larger than the value of the reference level θ, the level value a is not output to the output ports 3 but the value "0" is output. The same operation is further applied to level values b to h of other peripheral pixels b to h.

Therefore, for example, eight output ports 3 equal to the number of peripheral pixels are provided to the selection circuit 2, and the level values a to h are output to these output ports 3 when the absolute value of the above difference is smaller than the value of the reference level θ and the value "0" is output to the output ports 3 when the absolute value of the difference is larger than the value of the reference level θ. Moreover, an output port 4 is provided to the selection circuit 2 and the value of the number of the output ports 3 to which the above level values a to h are output is output to the output port 4. This point is different from the case of FIG. 5.

That is, when absolute values of differences between a watched pixel and peripheral pixels are all smaller than the value of the reference level θ, the level values a to h are output to the output ports 3 and the value "8" is output to the output port 4. Moreover, when absolute values of differences between the watched pixel and peripheral pixels are all larger than the value of the reference level θ, the value "0" is output from all the output ports 3 and the value "0" is output to the output port 4.

Furthermore, the level value o of the above watched pixel is supplied to a multiplier 9 and an optional gain set value α is supplied to the multiplier 9 and the multiplication of (α×o) is executed. Then, the multiplication value "α×o" derived from the output port 10 of the multiplier 9 is supplied to the adder 5 and added with the level values a to h selected by the output ports 3 of the above selection circuit 2. Moreover, an addition value derived from the output port 6 of the adder 5 is supplied to a divider 7.

Furthermore, the above gain set value α is supplied to an adder 11 and added with a value output from the output port 4 of the selection circuit 2. Then, the addition value of the gain set value α and the value of the number of output ports 3 to which the level values a to h are output, which is obtained by the output port 12 of the adder 11, is supplied to the divider 7. Thus, in the divider 7, a value output from the output port 6 of the adder 5 is divided by a value output from the output port 12 of the adder 11 and the value of the operation result is derived from the output port 8.

Thereby, when a gain set value α is equal to, for example, 1, the conventional averaging operation is performed and a new value of a watched pixel obtained through the averaging operation is derived from the output port 8. However, when assuming a gain set value α as, for example, 8, the rate of watched pixels relating to the averaging operation increases, the change of new values of watched pixels derived from the output port 8 is decreased, and a new value close to the original value is derived.

That is, when absolute values of differences between a watched pixel and peripheral pixels are all smaller than the value of the reference level θ, the value [a+b+c+d+e+f+g+h+α×o] is derived from the output port 6 of the adder 5. Moreover, the value [8+α] is derived from the output port 12 of the adder 11. Then, in the divider 7, (a+b+c+d+e+f+g+h+α×o)/(8+α) is computed and derived from the output port 8.

Then, for example, when absolute values of differences between a watched pixel and peripheral pixels are all smaller than the value of the reference level θ and a gain set value α is assumed as 1, a new value of (α+b+c+d+e+f+g+h+o)/(8+1) is derived from the output port 8. In this case, the rate of peripheral pixels and a watched pixel in the new value is ⅑=11.1% of the whole and thereby, image detail components become ⅑.

When absolute values of differences between a watched pixel and peripheral pixels are all smaller than the value of the reference level θ and a gain set value α as 8, a new value of (a+b+c+d+e+f+g+h+8×o)/(8+8) is derived from the output port 8. In this case, the rate of peripheral pixels in the new value is ¹⁄₁₆=6.25% while the rate of watched pixels is ⁸⁄₁₆=50% of the whole.

That is, in this case, by setting a gain set value to 8, the rate of a watched pixel is increased and the noise reduction effect is lowered by a value equivalent to the increased rate but image detail components are preserved. Thus, by optionally setting a gain set value α in the above circuit, it is possible to optionally set the degree of signal processing by controlling the rate of a watched pixel relating to the averaging operation in the so-called ε-filter and thereby, optimum image processing can be executed.

Therefore, for example, a photographer determines the state of an object and sets a gain set value α to an optional value so that optimum image processing can be performed. Specifically, a gain set value α is set to 1 in the case of a flat object such as a beach or sand hill and 8 in the case of a varied object such as a street corner. When a photographer actually manually sets a gain set value α, it is proper to set it to one of two stages such as 1 or 8.

However, even when the above setting is performed, the operation of an ε-filter is continued. Therefore, even if a gain set value α is set to 8, noises are reduced though the effect is deteriorated. This point is greatly different from the case of the above conventional ε-filter in which whether to perform signal processing or not is alternatively selected. Moreover, when setting includes no signal processing performed by an ε-filter, it is possible to apply a proper signal processing to various types of objects.

Therefore, in the case of the above embodiment, because the averaging operation is performed by weighting level values of watched pixels and optionally controlling the rate of the weighting level values, it is possible to optionally set the degree of signal processing by controlling the rate of watched pixels relating to the averaging operation in the so-called ε-filter and thereby, perform optimum image processing.

Consequently, according to the present invention it is possible to solve the following problem with a conventional apparatus in which whether or not to perform the signal processing in the so-called ε-filter has been an alternative, though in that case the state in which signal processing is performed or the state in which signal processing is not performed is not necessarily said to be an optimum image processing, either.

In the case of the above embodiment, a photographer determines the state of an object and manually sets a gain set value α. However, it is also possible to automatically set a gain set value α by determining the image of an object through image processing or the like. An embodiment making it possible to automatically set a gain set value α is described below.

Figure 2:
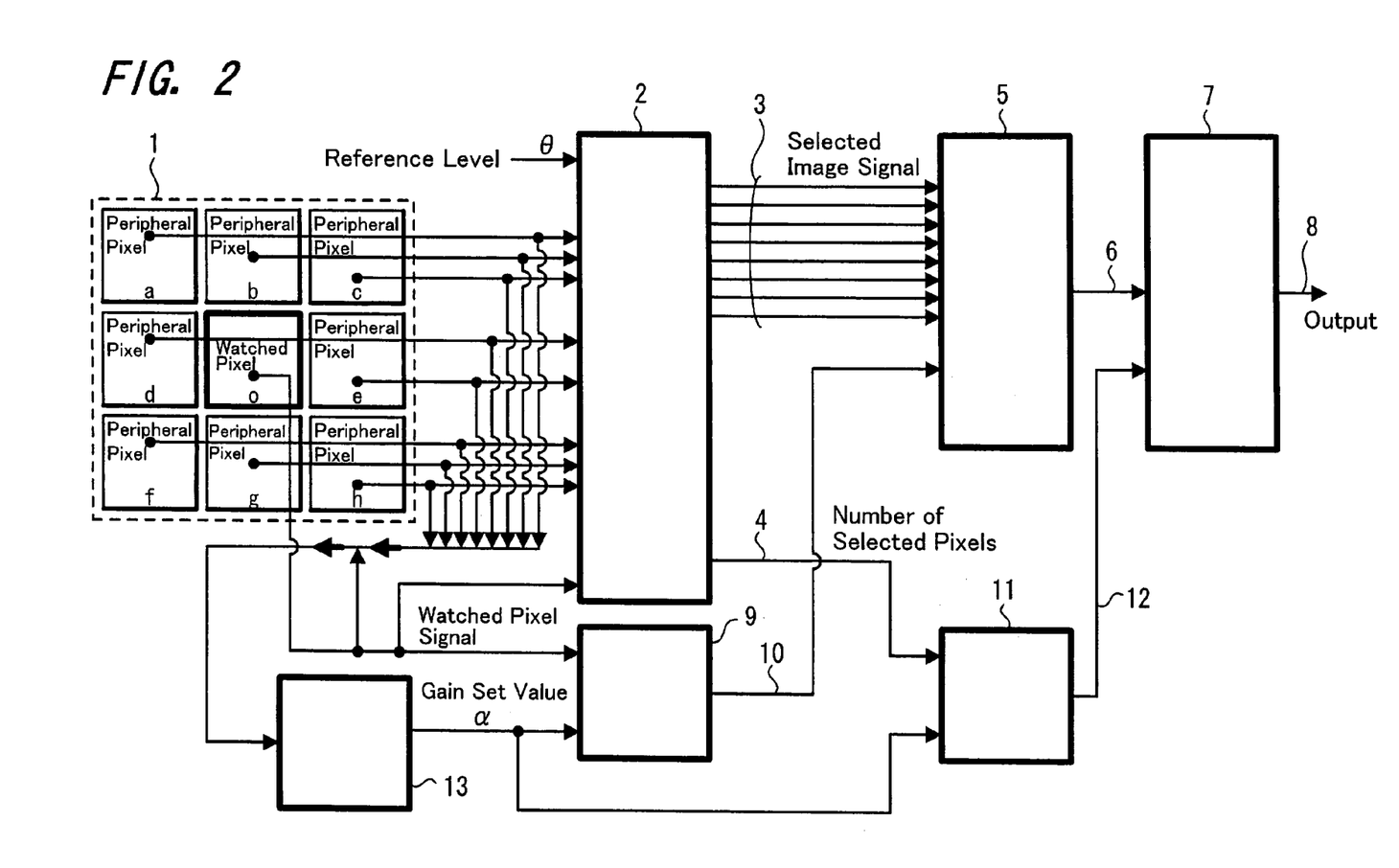
FIG. 2 is a block diagram showing a configuration of another embodiment of a selection circuit used for image noise reduction method and apparatus to which the present invention is applied.

That is, in this case, the level values a to h of peripheral pixels and the level value o of a watched pixel are supplied to an α-computing section 13 as shown in FIG. 2. In the α-computing section 13, the spatial frequency of an image formed by the above watched pixel and peripheral pixels is determined by the α-computing section 13 and moreover, a gain set value α is computed by determining the distribution of the spatial frequencies. Then, the gain set value α computed by the α-computing section 13 is supplied to the above multiplier 10 and adder 11. Other portions are constituted the same as the case of FIG. 1.

Figure 3:
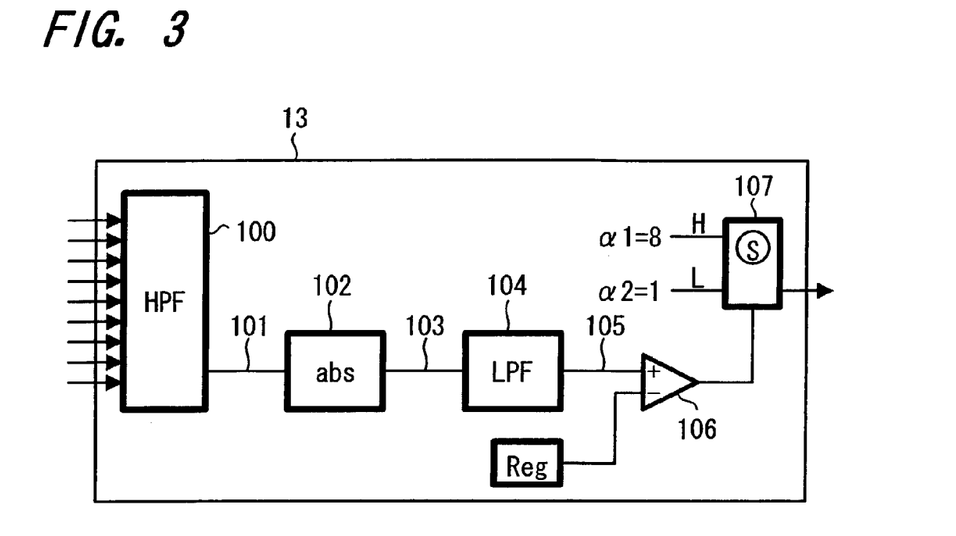
FIG. 3 is a block diagram for explaining an essential portion of the configuration in FIG. 2.

Furthermore, a specific configuration of the above α-computing section 13 is described below by referring to FIG. 3. However, embodiments of the present invention are not limited to this configuration. In FIG. 3, level values of the above peripheral pixels a to h and the watched pixel o are supplied to a spatial high-pass filter (HPF) 100. The high-pass filter 100 detects two-dimensionally how many high-frequency components are pre sent in an area when assuming the tap coefficient of the watched pixel as the value "8" and the tap coefficients of the peripheral pixels a to h as the value "−1".

Then, a signal obtained from the output port 101 of the high-pass filter 100 is supplied to a conversion-to-absolute-value circuit 102 and a signal obtained from the output port 103 of the conversion-to-absolute-value circuit 102 is supplied to a low-pass filter (LPF) 104. Moreover, a signal obtained from the output port 105 of the low-pass filter 104 is supplied to a comparator 106, and is compared with a reference value optionally set (Reg), and a comparison output is supplied to a control terminal of a selector 107.

Thereby, in the selector 107, when the number of high-frequency components which are spatial frequency components of the peripheral pixels a to h and the watched pixel o increases, the comparison output of the comparator 106 becomes "H" and a gain set value α1=8 is selected. However, when the number of high-frequency components which are spatial frequency components of the peripheral pixels a to h and the watched pixel o decreases, the comparison output of the comparator 106 becomes "L" and a gain set value α2=1 is selected. Then, a selected gain set value α is derived from the α-computing section 13.

Figure 4A:
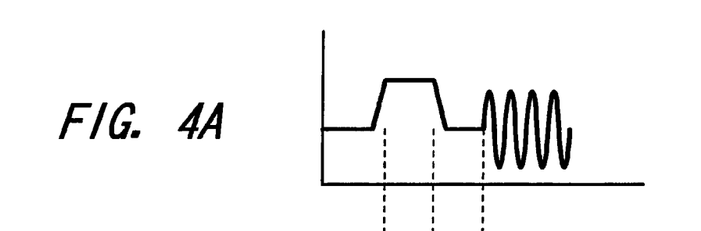
FIG. 4 is illustration for explaining operations of the configuration in FIG. 2.
Figure 4B:
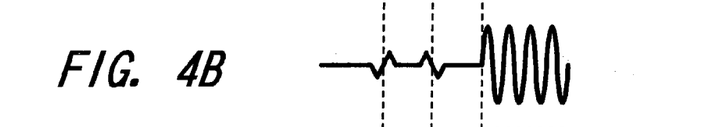
Figure 4C:
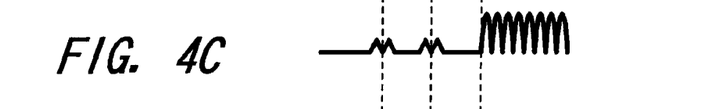

That is, when, for example, the signal shown in FIG. 4A is input, an output of the high-pass filter 100 shows the waveform shown in FIG. 4B and an output of the conversion-to-absolute-value circuit 102 obtained by converting the signal into an absolute value shows the waveform shown in FIG. 4C. In this case, at the portion of an input signal where the signal changes are moderate at the left of FIG. 4C, an output of the conversion-to-absolute-value circuit 102 becomes low-level and at the portion on the right side of FIG. 4C where input signal changes are violent, an output of the conversion-to-absolute value becomes high level.

Figure 4D:
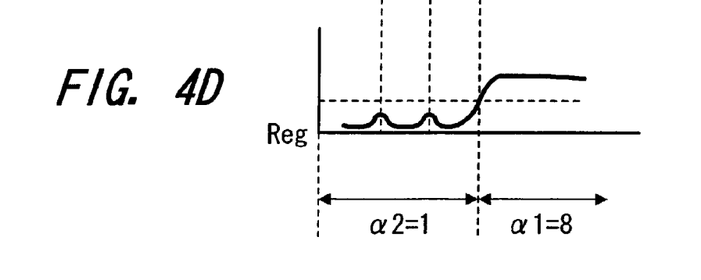

Then, these signals are sent to the low pass filter 104 to derive a signal indicating an envelope curve of the whole level values shown in FIG. 4D, and by comparing the signal by the comparator 106 with the preset reference value (Reg) it is possible to form a selection signal for selecting, for example, a gain set value α1 =8 or a gain set value α2=1 by the selector 107 in accordance with the degree of changes in the input signal. Thereby, a selected gain set value α is derived from the α-computing section 13.

Therefore, according to this embodiment, a gain set value α is automatically set and it is possible to eliminate the complexity that a photographer manually sets the value α. Moreover, according to this embodiment, it is possible to always change a gain set value α in accordance with states of the peripheral pixels a to h and the watched pixel o. For example, it is possible to set an optimum gain set value α for each portion of an individual object by detecting the portion in one screen.

Moreover, in the above embodiment, a gain set value α is set to two stages such as the gain set value α1=8 or the gain set value α2=1. However, it is also possible to set a gain set value α in multiple stages by more minutely analyzing the rate of high-frequency components in spatial frequency components of the peripheral pixels a to h and the watched pixel o. Furthermore, though not illustrated, it is possible to control whether or not to perform signal processing by an ε-filter by controlling the selection circuit 2 in accordance with a signal output from the α-computing section 13.

Thus, the above image noise reduction method is an image noise reduction method of detecting level differences between a watched pixel and its peripheral pixels, selecting only pixels whose level differences are smaller than a reference value, and applying the averaging operation to them, in which the degree of signal processing can be optionally set by weighting the level values of watched pixels and optionally controlling the rate of weighting level values and performing the averaging operation and thereby controlling the rate of watched pixels relating to the averaging operation by the so-called ε-filter and thereby, optimum image processing can be performed.

Moreover, the above image noise reduction apparatus is an image noise reduction apparatus for reducing noise components, which comprises detection means for detecting level differences between a watched pixel and its peripheral pixels, selection means for selecting only pixels whose level differences are smaller than a reference value, and operation means for performing the averaging operation by using selected pixels and which makes it possible to optionally set the degree of signal processing by using a means for weighting level values of watched pixels, controlling the rate of the weighting level values, and performing the averaging operations by the operation means and thereby controlling the rate of watched pixels relating the averaging operations by the so-called ε-filter and thereby, optimum image processing can be performed.

The present invention is not restricted to the above embodiments but it allows various modifications as long as the modifications are not deviated from the spirit of the present invention.

That is, according to the present invention, it is possible to optionally set the degree of signal processing by weighting level values of watched pixels, controlling the rate of the weighting level values, performing the averaging operations, and thereby controlling the rate of watched pixels relating to the averaging operations by the so-called ε-filter.

Moreover, according to the present invention, it is possible to perform optimum image processing in accordance with the image of an object by controlling weighting in accordance with the image of the object.

Furthermore, according to the present invention, it is possible to eliminate the complexity that a photographer manually sets a gain because the gain is automatically set by determining the spatial frequency of an image formed by a watched pixel and its peripheral pixels and controlling weighting in accordance with the above determination result.

Furthermore, according to the present invention, it is possible to perform very preferable processing by digitizing and processing each pixel level.

Furthermore, according to the present invention, it is possible to optionally set the degree of signal processing by weighting level values of watched pixels, optionally controlling the rate of the weighting level values, performing the averaging operations, thereby controlling the rate of watched pixels relating to the averaging operations by the so-called ε-filter and thereby, optimum image processing can be performed.

Furthermore, according to the present invention, it is possible to perform optimum image processing in accordance with the image of an object by using a means for controlling weighting in accordance with the image of the object.

Furthermore, according to the present invention, it is possible to eliminate the complexity that a photographer manually sets a gain because the gain is automatically set by using means for determining the spatial frequency of an image formed by a watched pixel and its peripheral pixels and control means for controlling weighting in accordance with the above determination result.

Furthermore, according to the present invention, it is possible to perform very preferable processing by digitizing and processing each pixel level.

Thereby, a conventional apparatus alternatively selects whether or not to perform signal processing by the so-called ϵ-filter. In this case, a case occurs in which a state performing or not performing processing is not necessarily the optimum image processing. However, the present invention can preferably solve the problems.

What is claimed is:

1. An image noise reduction method for reducing a noise component, comprising:
    detecting level differences between a watched pixel and peripheral pixels;
    selecting pixels having said level differences smaller than a reference value to perform averaging operations;
    weighting the level values of said watched pixel;
    controlling the rate of said weighting to perform said averaging operations; and
    setting a degree of signal processing by controlling the rate of said watched pixel via an ϵ-filter by setting a gain set value.

2. An image noise reduction method according to claim 1, further comprising:
    controlling the weighting in accordance with the image of an object.

3. An image noise reduction method according to claim 1, further comprising: determining the spatial frequency of an image comprised of the watched pixels and peripheral pixels; and
    controlling the weighting in accordance with the above determination result.

4. An image noise reduction method according to claim 1, further comprising:
    digitizing and processing each of the pixel levels.

5. An image noise reduction apparatus for reducing a noise component, comprising:
    detection means for detecting level differences between a watched pixel and peripheral pixels;
    selection means for selecting pixels having said level differences smaller than a reference value;
    operation means for performing averaging operations by using said selected pixels;
    weighting means for weighting level values of said watched pixel;
    controlling means for controlling the rate of said weighting to perform the averaging operations by the operation means; and
    setting means for setting a degree of signal processing by controlling the rate of said watched pixel via an ϵ-filter by setting a gain set value in said image noise reduction apparatus.

6. An image noise reduction apparatus according to claim 5, further comprising:
    control means for controlling the weighting in accordance with the image of an object.

7. An image noise reduction apparatus according to claim 5, further comprising:
    determining means for determining the spatial frequency of an image comprised of said watched pixels and peripheral pixels and control means for controlling the weighting in accordance with the above determination result.

8. An image noise reduction apparatus according to claim 5, wherein said pixel levels are digitized and processed.

* * * * *